ary Examiner—Ramon S Britts
United States Patent [19]
King, Jr.

[11] 3,965,792
[45] June 29, 1976

[54] SPLIT PINTAIL FASTENER ASSEMBLY

[76] Inventor: John O. King, Jr., 3990 N. Ivy Road, Atlanta, Ga. 30342

[22] Filed: Jan. 17, 1975

[21] Appl. No.: 542,074

[52] U.S. Cl. .................................. 85/7; 85/1 P; 403/331; 403/340
[51] Int. Cl.² .................................. F16B 19/05
[58] Field of Search ............... 85/7, 5 R, 1 R, 1 P, 85/3 R, 3 S; 403/339, 340, 331, 381

[56] References Cited
UNITED STATES PATENTS

| 911,854 | 2/1909 | Upson et al. | 403/339 X |
| 2,972,274 | 2/1961 | La Bombard et al. | 85/5 R X |
| 3,175,452 | 3/1965 | Leitner | 85/3 R |
| 3,779,127 | 12/1973 | Speakman | 85/7 |

Primary Examiner—Ramon S Britts
Attorney, Agent, or Firm—B. J. Powell

[57] ABSTRACT

A split pintail fastener assembly for installation in holes through work pieces including an elongate fastener with a bearing section to be placed in the holes, an engagement section to be engaged to hold the fastener in the holes, and a pintail section connected to the leading end of the engagement section by a frangible breakneck section; a pintail extension coaxially aligned with the leading end of the pintail section on the fastener; and connection means releasably connecting the trailing end of the pintail extension to the leading end of the pintail section on the fastener.

4 Claims, 9 Drawing Figures

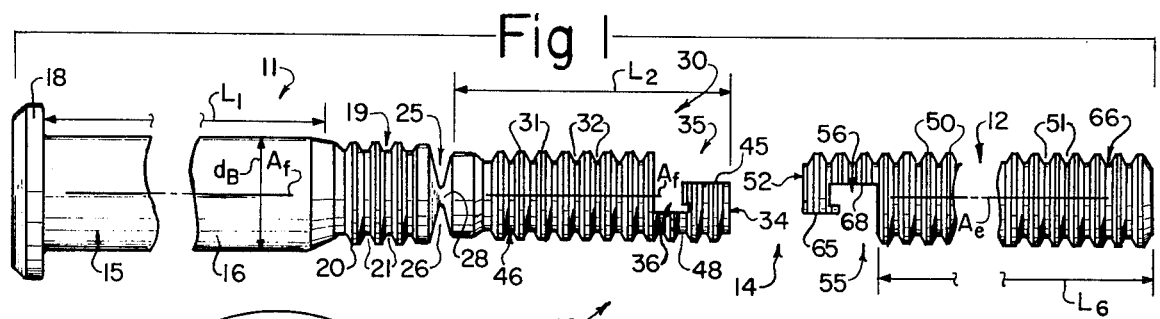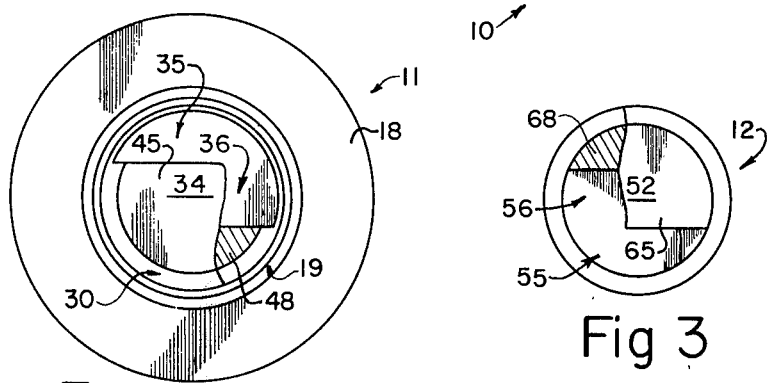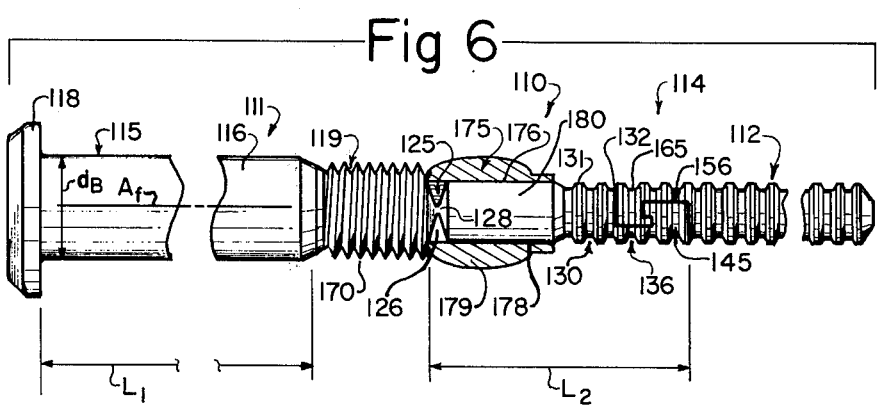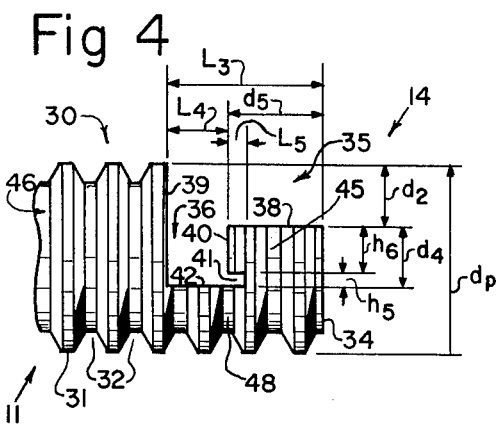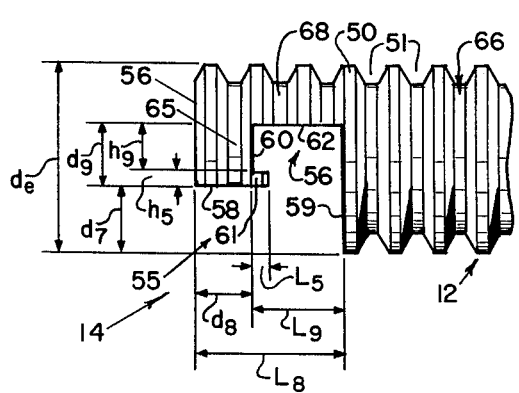

SPLIT PINTAIL FASTENER ASSEMBLY

BACKGROUND OF THE INVENTION

Fasteners such as lockbolts which have a pintail thereon for use in installing the fastener have become widely used. The pintail is broken from the fastener after the installation is complete and discarded. One of the major problems in using such fasteners, especially in the larger diameter and longer grip lengths, is that it is frequently not economically feasible to provide a sufficiently long pintail on the fastener when the fastener is installed in an interference fit. This is because the bearing section of the fastener, being larger than the initial hole diameter, must be pulled into the holes by the pintail rather than using the pintail only to grip the fastener while the collar is being swaged thereon. Thus, the pintail was required to be longer than the bearing section of the fastener which results in an economically unfeasible amount of material being discarded each time the pintail is broken from the fastener.

SUMMARY OF THE INVENTION

These and other problems and disadvantages associated with the prior art are overcome by the invention disclosed herein by providing a pintail extension as part of the tooling for installing the fastener which can be selectively connected to the pintail section on the fastener if an interference fit is required but can be disengaged from the pintail section after the fastener is in place so that the pintail section on the fastener can be made shorter. Because the pintail extension is saved and reused, this reduces the amount of material in the discarded pintail section of the fastener to a level which makes the fastener economically feasible to use. The pintail extension is held in place on the pintail section of the fastener during the installation thereof so that the extension acts as an elongated pintail on the fastener during the installation but can be readily removed therefrom after the installation of the fastener for reuse.

The apparatus of the invention includes a fastener having a pintail section thereon for use in pulling the fastener into position which is connected to the engagement portion of the fastener through a breakneck section that can be broken upon installation of the fastener to separate the pintail from the fastener proper. A pintail extension is provided which removably engages the pintail section on the fastener for use in pulling the fastener into position. The pintail extension can be readily removed from the pintail section on the fastener after the fastener is in place in the work pieces. This allows the fastener to be installed in an interference fit without rendering the fastener economically unfeasible to use.

These and other features and advantages of the invention disclosed herein will become more clearly understood upon consideration of the following specification and accompanying drawings wherein like characters of reference designate corresponding parts throughout the several views and in which:

BRIEF DESCRIPTION OF THE DRAWINGS

FIG. 1 is an exploded side elevational view of one embodiment of the invention;

FIG. 2 is a pintail end view of the fastener of FIG. 1 shown partly in cross-section;

FIG. 3 is an operating end view of the pintail extension of FIG. 1 shown partly in cross-section;

FIG. 4 is an enlarged portion of FIG. 1 showing the fastener part of the connection means;

FIG. 5 is an enlarged portion of FIG. 1 showing the pintail extension part of the connection means;

FIG. 6 is a side elevational view of the invention incorporated in a threaded bolt;

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Figure 7:
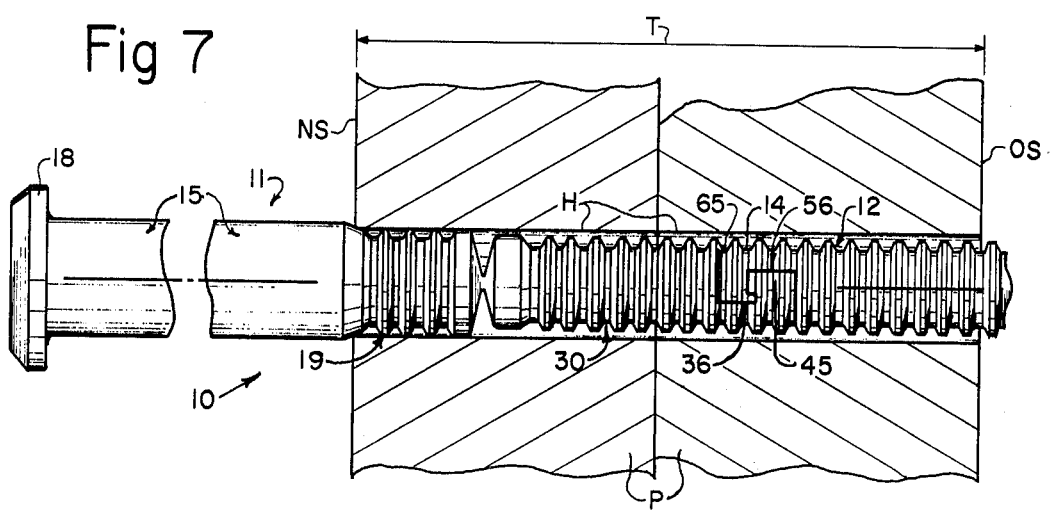
FIG. 7 is a view similar to FIG. 1 showing the invention ready for use.
Figure 8:
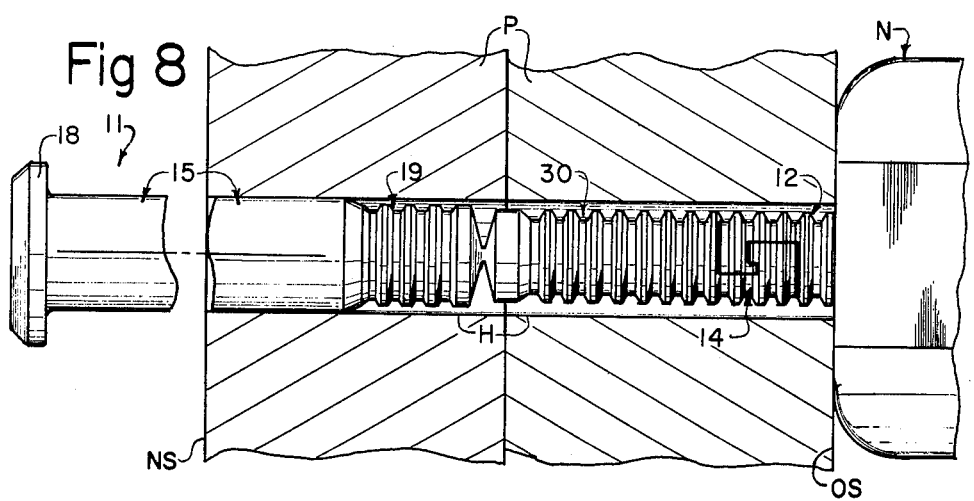
FIG. 8 is a view similar to FIG. 5 showing the invention being used.

Referring to FIGS. 1-5, a first embodiment of the invention is illustrated and is designated generally as fastener assembly 10. The fastener assembly 10 includes generally a fastener 11, a pintail extension 12, and connection means 14 formed in the leading end of the fastener 11 and the trailing end of the pintail extension 12 to releasably connect the pintail extension to the fastener. The fastener can be pulled through holes H in work pieces P using the pintail extension 12 as illustrated in FIGS. 7 and 8.

The fastener 11 has a bearing section 15 defining a bearing surface 16 of diameter $d_B$ on the outside thereof concentric about the fastener axis $A_f$. The bearing section 15 has a grip length $L_1$ which corresponds to the total thickness T of the work pieces P as is normally associated with fasteners. The trailing end of the bearing section 15 defines an enlarged head 18 thereon adapted to engage one side of the work pieces P when the fastener is in place in the holes H. The leading end of the bearing section 15 is provided with an engagement section 19 also centered on the axis $A_f$ coaxially with bearing section 15 which is adapted to be engaged by a conventional holding device to lock the fastener in place in the work pieces P. While different kinds of engagement sections 19 may be used, the particular engagement section 19 illustrated in FIGS. 1–2 is for a lockbolt type fastener with alternating locking ridges 20 and locking grooves 21 therearound. Ridges 20 and grooves 21 are designed to accept a swagable collar 22 illustrated in FIG. 9 thereon which is swaged in place in engagement with the ridges 20 and grooves 21 as an incident to the installation of the fastener 11. A frangible breakneck section 25 is integral with the leading end of the engagement section 19 and defines a breakneck groove 26 therein to produce a reduced diameter section 28 of diameter $d_1$ and a first prescribed minimum cross-sectional area that determines the amount of axial load that can be applied to the fastener 11 before fracture of the breakneck section 25 as will become more apparent. The leading end of the breakneck section 25 is integral with a generally cylindrical pintail section 30 centered on the fastener axis $A_f$ coaxially with bearing section 15 and which is provided with alternating pulling lands 31 and pulling grooves 32 adapted to be engaged by the nose assembly N as seen in FIG. 8 of a conventional lockbolt installation gun to pull the fastener 11 into the holes H. It will further be noted that the section 30 has a length $L_2$ which is shorter than the length $L_1$ of the bearing section 15 of the fastener as will be explained.

That portion of the connection means 14 associated with the fastener 11 is incorporated into the leading end 34 of the pintail section 30. The connection means 14 includes a transversely extending recess 35, the inside edge 38 of which lies along a chord of the pintail section 30, generally parallel to axis $A_f$, and the trailing edge 39 of which is oriented generally normal to the inside edge 38 and the axis $A_f$. The recess 35 has a depth $d_2$ and a length $L_3$ as will become more apparent. It will be seen that the recess 35 opens onto one side of the pintail section 30 and onto the leading end 34 of the pintail section 30. A transversely extending channel 36 which opens into the trailing end of recess 35 is also defined across the pintail section 30 beginning at the trailing edge of the recess 35 and extending forwardly therefrom a distance $L_4$. it will also be noted that the channel 36 has a depth $d_4$ from inside edge 38 of recess 35. The channel 36 has a generally rectangular cross-sectional shape with the trailing edge of the channel 36 being a continuation of the trailing edge 39 of the recess 35 and the leading edge 40 of the channel 36 being generally parallel to the edge 39 and trailing the leading end 34 of pintail section 30 by distance $d_5$. A transversely extending locating groove 41 may be defined in the pintail section 30 which opens into the leading edge 40 of the channel 36 with its inside edge forming a continuation of the inside edge 42 of the channel 36. The locating groove 41 has a convenient length $L_5$ and a convenient height $h_5$ which is less than the depth $d_4$ of the channel 36 as will become more apparent. Thus, it will be seen that a driven shoulder with a height $h_6$ is formed immediately leading channel 36 which is connected to the main body portion 46 of pintail section 30 by spacer section 48 extending past channel 36. The spacer section 48 has a second minimum cross-sectional area larger than the first minimum cross-sectional area of the breakneck section 25 so that the connection of the driven shoulder 45 to the main body portion 46 of pintail section 30 is stronger than breakneck section 25 as will become more apparent.

The pintail extension 12 is an elongate and generally cylindrical member with an axis $A_e$ and an outside diameter $d_e$ substantially equal to the outside diameter $d_p$ of the pintail section 30 of the fastener 11. The pintail extension 12 has an effective length $L_6$ which, when combined with the length $L_2$ of the pintail section 30 on fastener 11, is longer than the length $L_1$ of the bearing section 15 so that enough of the pintail extension 12 will project through the holes H from the off side OS of the work pieces P when the leading end of the bearing section 15 is at the near side NS of the work pieces P to allow the leading end of the pintail extension 12 to be gripped by the nose assembly N of the lockbolt installation gun as seen in FIG. 8. It will further be noted that the pintail extension 12 defines alternate pulling lands 50 and pulling grooves 51 thereon similar to the lands 31 and grooves 32 on the pintail section 30 of fastener 11 so that the pintail extension 12 forms a continuation of the pintail section 30 on the fastener 11 when the connection means 14 releasably connects the pintail extension 12 to the fastener 11 coaxially therewith.

That portion of the connection means 14 associated with the pintail extension 12 is provided on the trailing end 52 of the pintail extension 12. That portion of the connection means 14 located on the trailing end of pintail extension 12 includes a transversely extending recess 55, the inside edge 58 of which lies along a chord of the pintail extension 12 generally parallel to axis $A_e$ and the leading edge 59 of which is oriented generally normal to both the inside edge 58 and the axis $A_e$. The recess 55 has a depth $d_7$ and a length $L_8$ as will become more apparent. It will be seen that the recess 55 opens onto one side of the pintail extension 12 and onto the trailing end 52 of the pintail extension 12. A transversely extending channel 56 which opens into the leading end of recess 55 is also defined across the pintail extension 12 beginning at the leading edge of the recess 55 and extending rearwardly therefrom a distance $L_9$. It will also be noted that the channel 56 has a depth $d_9$ from the inside edge 58 of recess 55. The channel 56 has a generally rectangular cross-sectional shape with the leading edge of the channel 56 being a continuation of the leading edge 59 of the recess 55 and the trailing edge 60 of the channel 56 being generally parallel to the edge 59 and spaced forwardly of the trailing end 52 of pintail extension a distance $d_8$. A transversely extending locating lip 61 may be provided which projects forwardly from the trailing edge 60 of channel 56 into the channel 56. The lip 61 is sized to be slidably received in groove 41 to assist in maintaining the pintail extension coaxial with the fastener. The outside edge of lip 61 forms a continuation of the inside edge 58 of recess 55. Thus, it will be seen that a driving shoulder 65 with a height $h_9$ is formed immediately trailing channel 56 which is connected to the main body portion 66 of pintail extension 12 by spacer section 68 extending past channel 56. The spacer section 68 has a third minimum cross-sectional area larger than the first minimum cross-sectional area of the breakneck section 25 so that the connection of the driving shoulder 65 to the main body portion 66 of pintail extension 12 is stronger than breakneck section 25 as will become more apparent.

The driving shoulder 65 on pintail extension 12 fits in channel 36 on fastener 11 while driven shoulder 45 on fastener 11 fits in channel 56 on pintail extension 12 with the fastener and pintail extension coaxial. In this position as seen in FIG. 7, the driving shoulder 65 engages the driven shoulder 45 to pull the fastener 11 into the holes H behind the pintail extension as the pintail extension is pulled yet the pintail extension can be readily removed from the fastener and saved for reuse.

THREADED BOLT EMBODIMENT

Referring to FIG. 6, an alternate fastener assembly is illustrated and is designated generally 110. Those portions of assembly 110 corresponding to assembly 10 have like numerals applied thereto displaced by 100. The fastener assembly 110 also includes generally a fastener 111, a pintail extension 112, and connection means 114 formed in the leading end of the fastener 111 and the trailing end of the pintail extension 112 to releasably connect the pintail extension to the fastener. The fastener can be pulled through holes H in work pieces P using the pintail extension 112 similarly to assembly 10.

The fastener 111 has a bearing section 115 defining a bearing surface 116 of diameter $d_B$ on the outside thereof concentric about the fastener axis $A_f$. The bearing section 115 has a grip length $L_1$ which corresponds to the total thickness T of the work pieces P as is normally associated with fasteners. The trailing end of the bearing section 115 defines an enlarged head 118 thereon adapted to engage one side of the work pieces P when the fastener in in place in the holes H. The leading end of the bearing section 115 is provided with an engagement section 119 also centered on the axis $A_f$ coaxially with bearing section 115 which is adapted to be engaged by a conventional holding device to lock the fastener in place in the work pieces P. The particular engagement section 119 illustrated in FIG. 6 has bolt threads 170 thereon to receive a conventional internally threaded nut (not shown). A frangible breakneck section 125 is integral with the leading end of the engagement section 119 and defines a breakneck groove 126 therein to produce a reduced diameter section 128 of diameter $d_1$ and a first prescribed minimum cross-sectional area that determines the amount of axial load that can be applied to the fastener 111 before fracture of the breakneck section 125 as will become more apparent. The leading end of the breakneck section 125 is integral with a generally cylindrical pintail section 130 centered on the fastener axis $A_f$ coaxially with bearing section 115 and which is provided with alternating pulling lands 131 and pulling grooves 132 adapted to be engaged by the nose assembly of a conventional lockbolt installation gun similarly to assembly 10 to pull the fastener 111 into the work piece holes. It will further be noted that the section 130 has a length $L_2$ which is shorter than the length $L_1$ of the bearing section 115 of the fastener as explained for fastener 11.

A hole expanding collet 175 may be used in conjunction with fastener 111 as more fully explained in my co-pending application Ser. No. 542,077 filed the same day as this application entitled "Two Piece Mandrel Assembly and Method". The collet 175 defines a passage 176 therethrough to receive the pintail section 130 therein with a leading pilot portion 178 sized to center the collet in the holes through the work pieces as the collet is forced therethrough and a trailing expansion portion 179 larger than the initial hole diameter to expand the holes as the collet is forced therethrough. The leading end of the engagement section 119 of fastener 111 bears against the trailing end of the collet 175 so that the collet 175 is forced through the holes in the tork pieces as the fastener 111 is pulled into the holes. The collet 175 is also removable from the fastener 111. An appropriate cylindrical support section 180 may be provided adjacent the trailing end of the pintail section 130 to support the collet 175 against collapse as it is forced through the holes.

The connection means 114 is quite similar to means 14 so that the pintail extension 112 can be releasably and coaxially connected to the pintail section 130 on fastener 111. The connection is made by placing driving shoulder 165 on extension 112 in channel 136 in fastener 111 and driven shoulder 145 on fastener 111 in channel 156 in extension 112.

OPERATION

Figure 9:
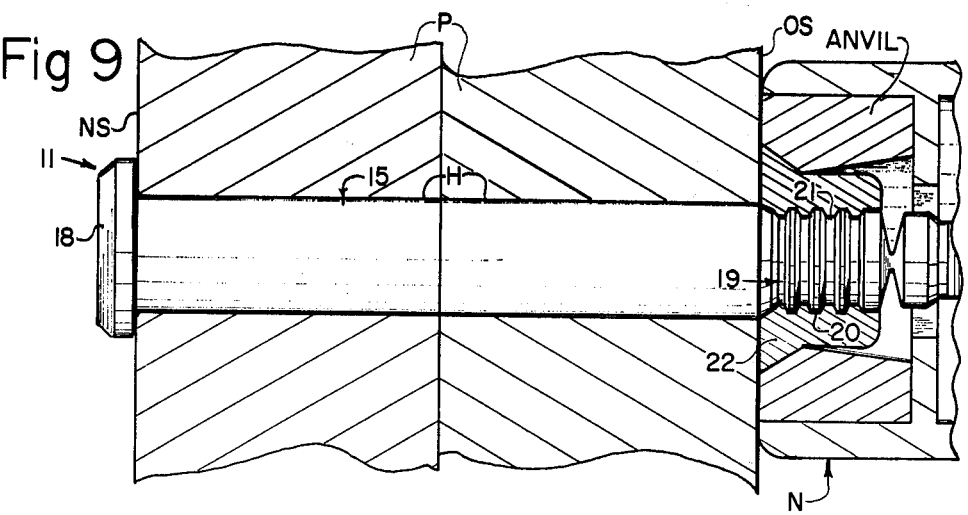
FIG. 9 is a view similar to FIG. 6 showing the fastener of the invention being finally installed.

The installation of the fastener assembly 10 is illustrated in FIGS. 7-9. It is further to be understood that the fastener assembly 110 would be installed in a similar manner except that the collet 175 would expand the holes through the work pieces as the fastener is pulled into position.

The fastener assembly 10 is first assembled with the pintail extension 12 attached to and coaxial with the fastener 11. This is performed by aligning the driving shoulder 65 on the pintail extension 12 with the channel 36 in fastener 11 while aligning the driven shoulder 45 on the fastener 11 with the channel 56 in the pintail extension 12. In this position, the shoulder 65 is inserted into channel 36 and the shoulder 45 into channel 56 so that the pintail extension 12 is coaxial with the fastener 11 and the shoulder 45 and 65 are in bearing engagement with each other. While the fastener is held in this position, it is inserted through the holes H in the work pieces P illustrated in FIG. 7. It will also be noted that the holes serve to keep the extension 12 from becoming disengaged from the pintail extesion 12 while the connection means 14 is located within the holes. When the groove 41 in the fastener 11 and the lip 61 on the pintail extension 12 are used as a locating means, it will be noted that the lip 61 must be laterally aligned with the groove 41 so that the connection may be made by sliding the pintail extension 12 sideways with respect to the fastener 11. It will thus be seen that the lip 61, in combination with the groove 41, serves to keep the pintail extension 12 coaxial with the fastener 11 along a first axis of movement and the holes maintain the pintail extension 12 coaxial with the fastener 11 along the other axis of movement.

After the fastener assembly 10 has been inserted in the holes H as seen in FIG. 7, the nose assembly N of a lockbolt installation gun is inserted over the projecting end of the pintail extension 12 so that the internal jaws of the nose assembly N grip the pintail extension 12. This is best seen in FIG. 8 in which the installation gun has been activated to pull the bearing section 15 on the fastener 11 into the holes H. The collar 22 may be inserted over the projecting end of the pintail extension 12 prior to the insertion of the nose assembly N thereover to install the fastener in a single operation, however, it is to be noted that once the connection means 14 has cleared the off side OS of the work pieces P, the pintail extension 12 may be disconnected from the pintail section 30 of the fastener 11, the collar 22 inserted over the projecting end of the pintail section 30 and the nose assembly N reinserted over the section 30 to finally install the fastener by swaging the collar 22 into the locking ridges 20 and the locking grooves 21 on the engagement section 19 as seen in FIG. 9.

The operation of the pintail extension 112 and the fastener 111 is generally the same as that disclosed for the fastener 10. However, it will be noted that once the collet 175 has been forced through the holes through the work pieces, it is removed, usually at the same time the pintail extension is disconnected from the pintail section 130 so that the conventional nut (not shown) can be inserted over the pintail section 30 and screwed onto the engagement section 119 to lock the fastener 111 in place.

While specific embodiments of the invention have been disclosed herein, it is to be understood that full use of modifications, substitutions and equivalents may be made without departing from the scope of the inventive concept as disclosed herein.

I claim:

1. A fastener assembly adapted to be installed through prescribed diameter aligned holes in work pieces having a prescribed combined thickness by pulling the assembly into position with a lockbolt installation gun comprising:

an elongate fastener having a fastener central axis and a leading end, and including a bearing section concentrically oriented about said central axis and having a bearing diameter larger than the prescribed hole diameter so that the bearing section must be forced into the holes and be in bearing contact with the holes through the work pieces, said bearing section having a first prescribed length substantially equal to the combined thickness of the work pieces; a head at one end of said bearing section adapted to engage the work pieces when said fastener is installed through the aligned holes; an engagement section at that end of said bearing section opposite said head concentrically oriented about said central axis coaxially with said bearing section and adapted to be engaged to hold said fastener in place in the work pieces, a frangible breakneck section at the leading end of said engagement section opposite said bearing section concentrically oriented about said central axis coaxially with said engagement section and said bearing section and having a prescribed reduced breakneck diameter substantially smaller than said bearing diameter to form a first minimum prescribed cross-sectional area which causes said breakneck section to fracture upon a prescribed axial load exerted thereon by the lockbolt installation tool; and a generally cylindrical pintail section having a leading end and a trailing end adapted to be engaged by the lockbolt installation gun leading said engagement section and concentrically oriented about said central axis coaxially with said engagement section and said bearing section, the trailing end of said pintail section connected to said engagement section through said breakneck section so that said pintail section is removed from said engagement section upon fracture of said breakneck section, said pintail section having a pintail diameter at least as small as the hole diameter, said pintail section having a second length shorter than said first length so that the leading end of said pintail section does not protrude through the holes when the leading end of said fastener is inserted in the holes until the leading end of said bearing section engages the work pieces about one end of the aligned holes, said pintail section defining a first recess at the leading end thereof extending transversely of said central axis along a chord of said pintail section, said first recess opening onto the leading end of said pintail section and along the periphery of said pintail section, said first recess having a depth less than one-half of said pintail diameter and a first prescribed pintail recess length from its leading end to its trailing end, said pintail section further defining a first channel therein transversely extending across said pintail section and having a trailing end and a leading end, said first channel opening into said first recess adjacent the trailing end thereof, said pintail section further comprising a driven shoulder at the leading end thereof defined by said first recess and said first channel, said driven shoulder adjacent said first channel at the leading end of said first channel, and said pintail section further comprising a first spacer section extending across said first channel opposite said first recess and connecting said driven shoulder to the remainder of said pintail section, said first spacer section having a second minimum prescribed cross-sectional area greater than said first prescribed cross-sectional area of said breakneck section to prevent fracture of said first spacer section prior to fracture of said breakneck section under axial loading; and, a generally cylindrical pintail extension coaxially aligned with the leading end of said pintail section having a leading end and a trailing end adapted to be engaged by the lockbolt installation gun, said pintail extension concentrically oriented about a second central axis coaxial with said first central axis, said pintail extension having an extension diameter at least as small as the hole diameter, said pintail extension having a third length so that the leading end of said pintail extension protrudes through the holes when the leading end of said fastener is inserted in the holes until the leading end of said bearing section engages the workpieces about one end of the aligned holes, said pintail extension defining a second recess at the trailing end thereof extending transversely of said second central axis along a chord of said pintail extension, said second recess opening onto the trailing end of said pintail extension and along the periphery of said pintail extension, said second recess having a depth less than one-half of said extension diameter and a second prescribed pintail recess length from its leading end to its trailing end substantially equal to said first recess length, said pintail extension further defining a second channel therein transversely extending across said pintail extension and having a trailing end and a leading end, said second channel opening into said second recess adjacent the leading end thereof, said pintail extension further comprising a driving shoulder at the trailing end thereof defined by said second recess and said second channel, said driving shoulder adjacent said second channel at the trailing end of said second channel, and said pintail extension further comprising a second spacer section extending across said second channel opposite said second recess and connecting said driving shoulder to the remainder of said pintail extension, said second spacer section having a third minimum prescribed cross-sectional area greater than said first prescribed cross-sectional area of said breakneck section to prevent fracture of said second spacer section prior to fracture of said breakneck section under axial loading, said driving shoulder in said first channel and said driven shoulder in said second channel so that the exertion of an axial load on said pintail extension exerts an axial load on said fastener to force said fastener into said holes 2. The fastener assembly of claim 1 wherein said pintail section further includes first locating means and wherein said pintail extension further includes second locating means cooperating with said first locating means for releasably maintaining said driven shoulder in said second recess and said driving shoulder in said first recess.

3. The fastener assembly of claim 1 wherein said engagement section defines alternating lockbolt collar receiving grooves and ridges thereon.

4. The fastener assembly of claim 1 wherein said engagement section defines bolt threads thereon.

* * * * *